CHESTER W. NEWELL
*INVENTOR.*

BY
Flehr and Swain
ATTORNEYS

CHESTER W. NEWELL
INVENTOR.
BY
Flehr and Swain
ATTORNEYS

CHESTER W NEWELL
*INVENTOR.*

BY
Flehr and Swain
ATTORNEYS

Aug. 7, 1962 C. W. NEWELL 3,048,652

COLOR TELEVISION RECORDING SYSTEM AND METHOD

Filed Feb. 24, 1958 5 Sheets-Sheet 4

CHESTER W. NEWELL
*INVENTOR.*

BY Fleher & Swain
ATTORNEYS

CHESTER W. NEWELL
*INVENTOR.*

BY
Fleht & Swain
ATTORNEYS 3,048,652

COLOR TELEVISION RECORDING SYSTEM AND METHOD

Chester W. Newell, Sunnyvale, Calif., assignor to Ampex Corporation, Redwood City, Calif., a corporation of California Filed Feb. 24, 1958, Ser. No. 717,019
14 Claims. (Cl. 178—5.2)

This invention relates generally to a signal processing and recording system and method, and more particularly to a signal processing and recording system and method for processing and recording a plurality of signals each occupying a relatively wide frequency band to form a composite signal occupying a frequency band corresponding to that occupied by the signal having the widest frequency band and containing only simple frequencies, that is, a signal frequency without interlacing or multiplexing commonly known as a simplex signal. More particularly, the signal processing system and method is adapted to process color video signal intelligence to form a simple signal occupying a bandwidth corresponding to the luminance portion of the signal containing all of the color intelligence or information which is suitable for recording.

In the U.S. the NTSC color system has been adopted. It is a compatible system in which all of the video intelligence is contained within a bandwidth of 4.5 megacycles or less. In general, the monochrome video signal (Y, luminance portion) is derived by combining the signals from three color cameras in predetermined proportions to form the same. Two other signal portions are required to transmit the necessary color information. These are the chrominance signals and are often referred to as the I and Q signals. These signals represent the best known method of transmitting in conjunction with the Y signal all of the color information needed to reproduce a good color picture at the receiver.

The video information contained in these three channels is compressed into a bandwidth corresponding to the Y information by interlace multiplexing techniques. As is well known, multiplexing is the transmission of two or more individual types of signal information over a single transmission channel in such a way that they may be separated without distortion at the receiving end.

To transmit the Y, I and Q signals within the conventional bandwidth employed in monochrome, the information is processed in a special manner. The I and Q signals are each modulated on a subcarrier. Two subcarriers are employed, one for the I signal and one for the Q signal with the carriers having a common frequency of nominally 3.58 megacycles but differing in phase by 90°.

Suppressed carrier modulation is employed in transmitting the I and Q signals. Thus, at the receiver a carrier must be re-introduced with the proper frequency and phase relationship with respect to the transmitted signal. This phase relationship is maintained by providing a reference frequency burst which appears on the back porch of the horizontal blanking pulses. This frequency burst is employed to control a local oscillator which re-injects the carrier.

Various systems have been developed for recording and/or reproducing signals over a wide frequency spectrum. One practical use for such systems is in the recordation and reproduction of monochrome television programs. One such recording and/or reproducing system makes use of a rotary head assembly for magnetically recording and/or reproducing signals over a wide frequency spectrum. The rotary assembly employed has several electromagnetic heads that are mounted to rotate and sweep across separate track portions of a magnetic tape as the tape is moved lengthwise past the rotating heads. Systems and methods of the type described are disclosed in copending applications Serial No. 427,138, filed May 3, 1954, issued as Patent No. 2,916,546, Serial No. 506,182, filed May 5, 1955, issued as Patent No. 2,916,547, Serial No. 524,004, filed July 5, 1955, issued as Patent No. 2,956,114, Serial No. 552,868, filed Dec. 13, 1955, issued as Patent No. 2,921,990, Serial No. 614,420, filed Oct. 8, 1956, issued as Patent No. 2,968,692, and Serial No. 636,536, filed January 28, 1957, issued as Patent No. 3,005,869.

Between recordation and reproduction of composite multiplexed signals of the type described, it is necessary to maintain the phase and time relationships between the various signal components within specified limits. If the phase and time relationships are outside these limits, the picture reproduced on a receiver is distorted. Control systems for maintaining the necessary phase and time relationships are relatively complex.

It is a general object of the present invention to provide a signal processing and recording system and method which is suitable for processing and recording and/or reproducing color television signal intelligence and the like.

It is another object of the present invention to provide a signal processing system and method in which redundant signal intelligence is sampled and combined to form a composite signal having a simple bandwidth.

It is another object of the present invention to provide a signal processing system and method whereby a simple bandwidth is formed by sampling techniques from a plurality of signals which occupy relatively broad bandwidths and contain redundant information.

It is another object of the present invention to provide a signal processing system and method for forming a simple signal occupying a predetermined bandwidth containing information corresponding to a plurality of signals at least one of which has a bandwidth substantially equal to the simple signal.

It is another object of the present invention to provide a signal processing and recording system and method suitable for processing and recording color television signal intelligence and the like with tolerable timing and phasing errors.

It is still another object of the present invention to provide a signal processing and recording system and method suitable for recording and/or reproducing color television intelligence with apparatus of the type which is suitable for monochrome recording and/or reproducing.

These and other objects of the invention will become more clearly apparent from the following description when read in conjunction with the accompanying drawing.

Referring to the drawing.

Television systems are employed to transmit a rapid succesion of images. In general, any one image does not differ greatly from those transmitted immediately before or after. The majority of the information transmitted is redundant. For example, in a picture in which no motion is being transmitted, the signal is truly periodic with a fundamental frequency of 30 c.p.s. (the frame rate).

In a television picture for vertical resolution comparable to that in the horizontal direction a smaller number of scanning lines is required for the Q and I signals than are required for the Y signal. Furthermore, relatively fewer lines are required for the lower frequency components of the Y and I signals than for the higher frequency components of these signals. In other words, for any given frame a large number of the lines writing Q information and a large number of the lines writing I information are redundant.

The signal processing and recording system and method of the invention employs sampling techniques to form a recordable composite signal having a simple bandwidth. Only certain ones of the redundant lines are retained while others are rejected. In reproduction the redundant lines which were rejected during recordation are replaced by repetition of retained ones of the redundant lines.

Throughout the remainder of the description reference will be made to the U.S. NTSC color television signal. This comprises a Y signal occupying the nominal bandwidth 0–4.5 mc., an I signal occupying the nominal bandwidth 0–1.5 mc., and a Q signal occupying a nominal bandwidth 0–0.5 mc. The Y signal carries the luminance information for compatability with black and white television receivers. It is, of course, to be understood that the invention is not to be limited in this respect as it may be modified to accommodate television signals having other standards and the like.

Figure 1:
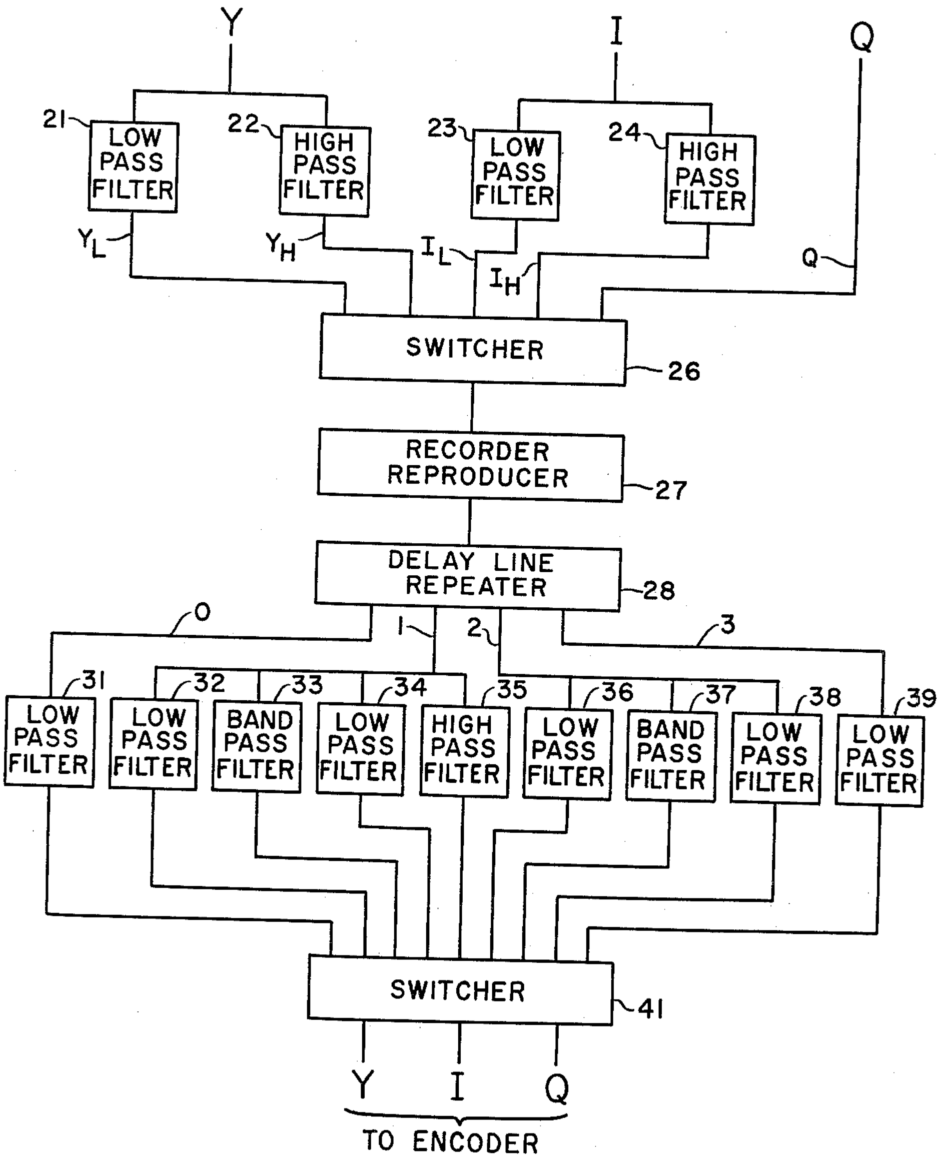
FIGURE 1 is a schematic block diagram showing the invention employed for color television signal intelligence processing.

Referring more particularly now to FIGURE 1, a block diagram of the system for processing and recording the signal intelligence is shown as well as a system for reproducing and reconstructing the original signals.

The Y signal is passed through a pair of filters 21 and 22 which are low pass and high pass filters, respectively, to the switcher 26. For a particular signal of the type described above, the low pass filter preferably has a pass band 0–1.5 mc. and the high pass filter has a pass band 1.5–4.5 mc. The I signal is applied to a pair of filters 23 and 24 which are low pass and high pass filters, respectively. The low pass filter has a pass band 0–0.5 mc., and the high pass filter has a pass band 0.5–1.5 mc. The Q signal is passed directly to the switcher.

The filters may be passive or active networks which have a relatively flat pass region. The phase throughout the pass band and roll-off portions should be substantially constant.

The switcher 26 is connected to the outputs of the filters 21–24 and to the Q signal source, lines $Y_L$, $Y_H$, $I_L$, $I_H$ and Q. The switcher 26 serves to selectively connect a mixer (not shown in this figure) to the filters 21–24 and the Q signal. The mixer combines the information to form a composite signal occupying a simple bandwidth. The signal occupies a bandwidth corresponding to the bandwidth of the Y signal. By a simple frequency it is meant that there is no frequency interlace or multiplexing.

Figures 4, 5:
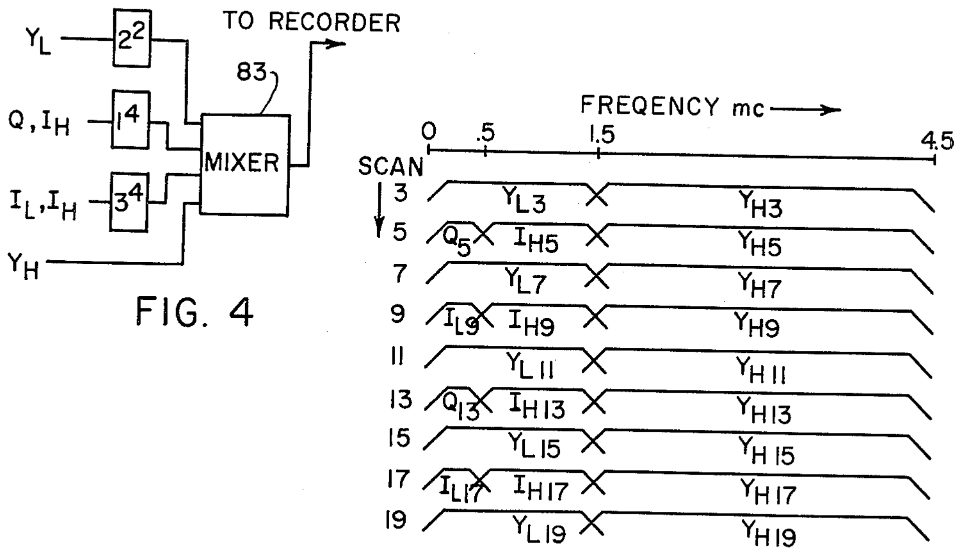
FIGURE 4 shows the connection of the gates for the recording or transmitting switcher of FIGURE 1.
FIGURE 5 shows the signal output of the recording or transmitting switch.

Referring particularly to FIGURE 5, a processed signal, corresponding to the odd scans for a particular sequence of switching is illustrated. Thus, on scan number 3 the signal which appears at the output of the switcher comprises the complete Y signal, $Y_{L3}$ and $Y_{H3}$. The switcher has connected the lines $Y_L$ and $Y_H$ to the mixer. On scan 5 the information which appears at the output of the switcher includes all of the Q information, $Q_5$, the portion of the I information which has been passed by the high pass filter 24, $I_{H5}$, and the portion of the Y signal which has been passed by the high pass filter 22, $Y_{H5}$. During the seventh scan the information which appears at the output of the switcher is again the total Y information, $Y_{L7}$ and $Y_{H7}$. During the ninth scan the information which appears at the output of the switcher corresponds to the portion of the I signal passed by low pass filter 23, $I_{L9}$, the portion of the I signal passed by the high pass filter 24, $I_{H9}$, and the high frequency portion of the Y signal, $Y_{H9}$. The eleventh scan includes all of the Y information, $Y_{L11}$ and $Y_{H11}$. The thirteenth scan corresponds to the fifth but includes the corresponding Q, $I_H$ and $Y_H$ information for the particular scan, $Q_{13}$, $I_{H13}$, $Y_{H13}$. The remainder of the scans are repetitive of the process just described. It is noted that during any scan the signal intelligence occupies a simple bandwidth, 0–4.5 mc.

A switcher which is suitable for electronically performing the switching operation to form a composite simple signal of the type illustrated will be presently described. In general, the switcher should include switching means which are capable of being rapidly switched and which in the off condition are about 40 db down.

Analysis of the frequency spectrum of FIGURE 5 shows that during each of the scans the bandwidth present includes a simple frequency spectrum. The Q signal intelligence appears every fourth line; the low frequency components of the I signal intelligence appear every fourth line; the high frequency components of the I signal intelligence appear every second line; the low frequency components of the Y signal intelligence appear every other line; and the high frequency components of the Y signal intelligence appear every line. The signal information contained in these signals is suitable for reprocessing to reconstruct the Y, I and Q signals.

Because of the nature of the switching (sampling), portions of the horizontal synchronizing pulses are eliminated. The switcher includes suitable means for re-inserting these signal portions. The output of the switcher (mixer) will contain a signal having suitable horizontal and vertical synchronizing pulses and timing bursts. Techniques for adding or inserting the sync pulses and the burst pulse are well known in the art and will not be described in detail.

The output of the switcher in FIGURE 1 is shown being applied to a recorder or reproducer 27 of a type suitable for recording a wide frequency spectrum. One such recorder is described in the pending applications referred to above.

When the recorded signal is reproduced, the signal is applied to a delay line repeater 28 which serves to delay the signal. The delay line repeater comprises serially connected delay lines each serving to delay the signal information 63.5 microseconds, the time occupied in scanning a single line. The delay lines may, for example, be of the solid quartz type. In the system illustrated the signal is available without delay, line 0, with a 63.5 microseconds' delay, line 1, with a 127 microseconds' delay, line 2, and with a 190.5 microseconds' delay, line 3.

The lines 0–3 are connected to a plurality of filters 31–39 in a predetermined manner. The filters are of the type previously described. The signal from line 0 (no delay) is applied to the low pass filter 31 which has band pass characteristic 0–0.5 mc. The signal from line 1 (63.5 microseconds' delay) is applied to the filters 32, 33, 34 and 35. The low pass filter 32 has band pass characteristics 0–.5 mc., the band pass filter 33 has pass characteristics .5–1.5 mc., the low pass filter 34 has pass characteristics 0–1.5 mc., and the high pass filter 35 has pass characteristics 1.5–4.5 mc. The signal from line 2 (127 microseconds' delay) is applied to the filters 36, 37 and 38. The low pass filter 36 has a pass band 0–.5 mc., the band pass filter 37 has a pass band .5–1.5 mc., and the low pass filter 38 has a pass band 0–1.5 mc. The signal from line 3 (190.5 microseconds' delay) is applied to the low pass filter 39 which has a pass band 0–.5 mc.

The signals from the filters 31–39 are applied to a switcher 41 which serves to selectively switch to the output of predetermined ones of the filters and apply the signals to mixers (not shown) to reconstruct the Y, I and Q signals. A suitable switching circuit will be presently described in detail.

Figure 10:
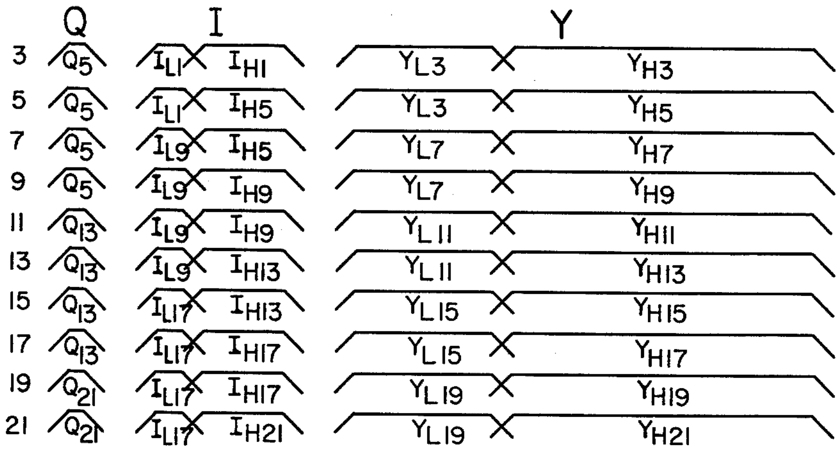
FIGURE 10 shows the reconstructed color signal intelligence at the output of the switcher.

A reconstructed frequency spectrum including Y, I and Q information is shown in FIGURE 10. The frequency spectrum illustrated in FIGURE 10 is reconstructed from the processed signal intelligence shown in FIGURE 5. Generally, the frequency spectrum is reconstructed by repeating the sample Q intelligence for four consecutive lines, the low frequency portion of the I intelligence, $I_L$, for four consecutive lines, the high frequency portion of the I intelligence, $I_H$, and the low frequency Y intelligence, $Y_L$, for two consecutive lines and the high frequency Y intelligence $Y_H$ every line to give the resultant spectrum illustrated.

Referring now more particularly to FIGURES 1, 5, 8 and 10, the action of the circuit to reconstruct the signal will be described. In the example to follow, the time reference is taken at the output of the first delay. For reconstruction of the Y, I and Q signal for scan number 3, the processed signal intelligence is sampled when the reproduced or received scan number 3, FIGURE 5, appears at the output of the first delay, line 1. At this time the signal corresponding to scan number 1 is at line 2, second delay, and the signal corresponding to scan 5 is at line 0, no delay. During this scan the switcher connects low pass filter 34 and high pass filter 35 to the mixer for line Y. The signal at line Y is $Y_{L3}$ and $Y_{H3}$. During this same time the switcher connects low pass filter 31 to line Q. Low pass filter 31 is connected to line 0, no delay, and the reproduced or received signal at the filter corresponds to scan 5, FIGURE 5. Thus, the signal at line Q is $Q_5$. Also during this scan the switcher connects the mixer for line I to band pass filter 37 and low pass filter 38 which, in turn, are connected to line 2. The information appearing on this line corresponds to the sampled signal for scan number 1, not shown. The signal at line I is $I_{L1}$ and $I_{H1}$. The reconstructed Y, I and Q signals are illustrated in FIGURE 10. To reconstruct the signal for scanning line 5, the switcher connects a new set of filters to the lines Y, I and Q. The processed signal has now advanced down the delay line one position, that is, the signal corresponding to processed scan 7, FIGURE 5, is at line 0, scan 5 is at line 1, scan 3 is at line 2 and scan 1 is at line 3. The switcher serves to connect the mixer for line Y to low pass filter 38 and high pass filter 35 giving a mixed signal containing $Y_{L3}$ and $Y_{H5}$ frequency components; the mixer for line I to band pass filter 33 and low pass filter 39 giving a mixed signal containing $I_{H5}$, $I_{L1}$ frequency components and line Q to low pass filter 32 giving the signal $Q_5$. For scan 7 the switcher connects the mixers and line Q to appropriate ones of the lines to give a signal output having $Q_5$, $I_{L9}$ and $I_{H5}$, $Y_{L7}$ and $Y_{H7}$. The mixers and line are connected to the following filters: low pass filter 34, high pass filter 35, low pass filter 31, band pass filter 37, and low pass filter 36. The reconstructed signal for scan 9 contains the following frequency components $Y_{H9}$, $Y_{L7}$ $I_{L9}$, $I_{H9}$ and $Q_5$. To reconstruct this signal the switcher connects the following filters to the mixers and line Q; high pass filter 35, low pass filter 38, low pass filter 32, band pass filter 33 and low pass filter 39. The switching sequence for the reconstruction of the signal for scan number 11 is the same as that for scan 3. The following scanning lines 13, etc., are reconstructed by switching as in lines 5, etc.

Examination of the reconstructed frequency spectrum of FIGURE 10 brings the following points to light. The Q signal is repeated four times as is the $I_L$ signal. These contain the low frequency components and because of the redundancy of the signal intelligence gives a signal suitable for reproduction by a television receiver. The $I_H$ and $Y_L$ signals are repeated twice. These signals contain the intermediate frequency components and again because of the redundant nature of the signal intelligence give a suitable reproduction. The $Y_H$ information appears every line.

An important feature of the invention is the ability to fix the zero reference at any one of the lines. Thus, as illustrated, the reconstructed Q signal is never obtained more than two lines away nor is the $I_L$ signal. If the reference were placed at line 0, the signal intelligence would be thrice removed every fourth scan.

Figure 2:
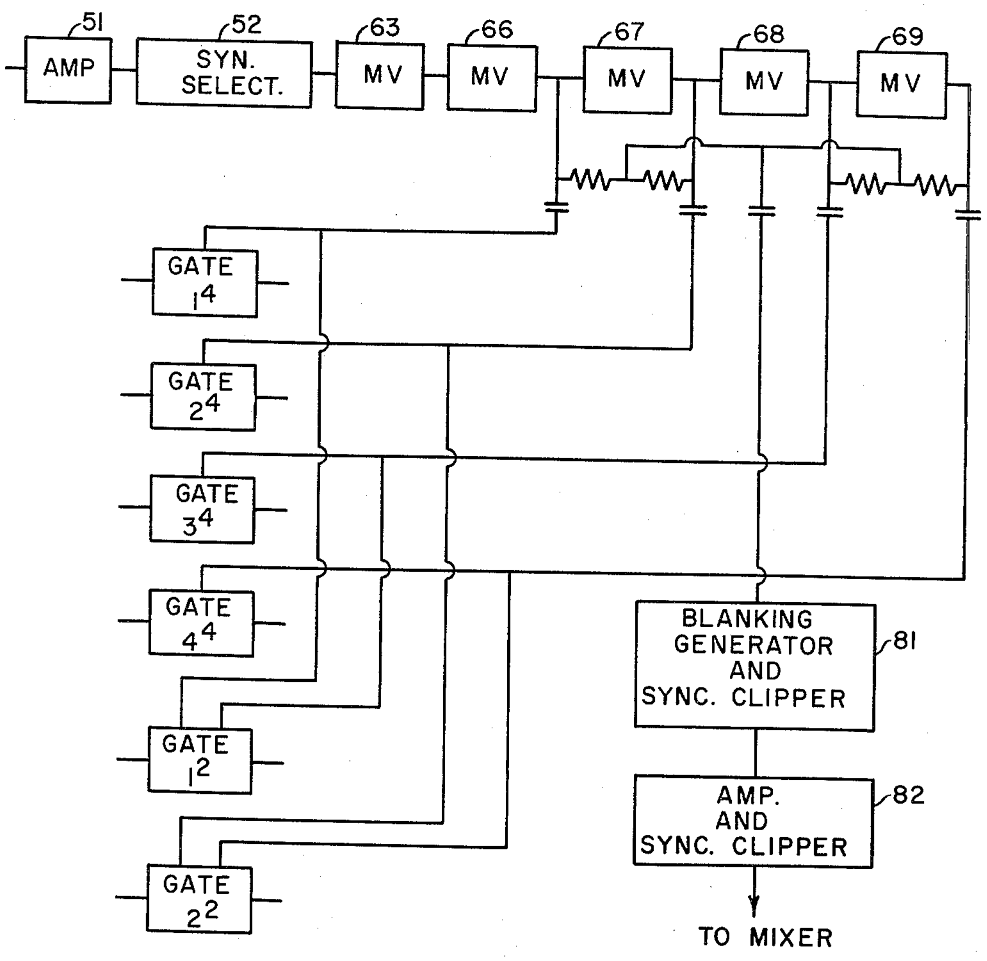
FIGURE 2 is a block diagram of the switcher circuits of FIGURE 1.

A system suitable for performing the switching operations described, switches 26 and 41, is shown in FIGURE 2. The synchronizing signals, both vertical and horizontal, are recovered from the input signal and are amplified by the amplifier 51. The amplified signal is applied to the sync selector 52 which selects the horizontal sync pulses.

Figure 6:
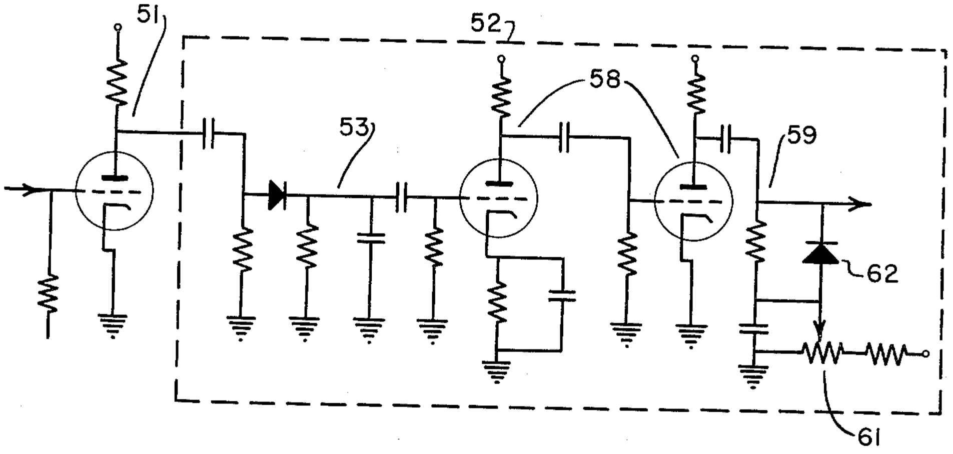
FIGURE 6 is a circuit diagram of the sync selector circuit of FIGURE 2.
Figure 7:
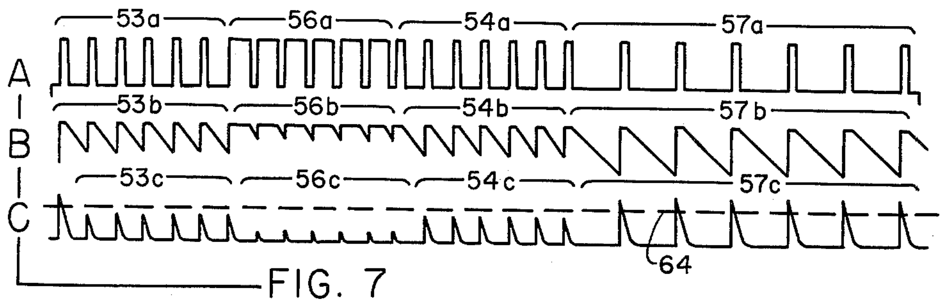
FIGURE 7 illustrates the operation of the sync selector of FIGURE 6.

A suitable selector is illustrated in FIGURE 6. The output of the amplifier 51 is applied to the selector 52 which comprises a two stage amplifier including an input circuit 53. Waveforms depicting the operation of the selector 52 are illustrated in FIGURE 7. The amplified input signal from the amplifier 51 is shown at FIGURE 7A and the amplified output from the selector 52 is shown at FIGURE 7C. The input circuit 53 serves as a pulse discriminator to provide an input to the amplifier stage 58 which is of the type shown in FIGURE 7C but which has substantially less amplitude. The waveform at the point 7B of the discriminator circuit is shown in FIGURE 7B. The signal during the equalizing pulse intervals 53*a* and 54*a*, the vertical sync pulse interval 56*a* and the horizontal sync pulse interval 57*a* are shown at 53*b*, 54*b*, 56*b* and 57*b*, FIGURE 7B. The input signal to the amplifier stage 58, as previously described, is similar to the waveform shown in FIGURE 7C. The numerals 53*c*, 54*c*, 56*c* and 57*c* indicate the output signal during the pulse intervals referred to above. It is observed that the amplified waveform has a lower amplitude during the equalizing pulse intervals 53*a* and 54*a* and the vertical sync pulse intervals 56*a* than it has during the horizontal sync pulse interval 57*a*. The output stage of the amplifier includes a sync selector means 59 which is provided with a sync level selector 61 to control the bias on the diode 62. By adjusting the bias on the diode only amplified pulses having a predetermined amplitude will serve to trigger the following multivibrator 63. By way of example, the dotted line 64 shows a suitable level.

The multivibrator 63 divides by four and provides an output pulse every fourth horizontal sync pulse. These pulses are applied to mono-stable multivibrators 66, 67, 68 and 69 which are connected in cascade. The period of the multivibrators 66, 67, 68 and 69 is 63.5 microseconds. That is, upon application of a pulse from the multivibrator 63, the multivibrator 66 flips and then reverts to its original state in 63.5 microseconds. When the multivibrator 66 reverts, it triggers the multivibrator 67 which also has a 63.5 microseconds' interval as do the multivibrators 68 and 69. Thus, it is seen that the alternate ones of multivibrators 66, 67, 68 and 69 are triggered during alternate scanning lines. These multivibrators are connected to apply a voltage to the gates $1^4$, $2^4$, $3^4$, $4^4$, $1^2$ and $2^2$. The gates $1^4$, $2^4$, $3^4$ and $4^4$ are controlled by the multivibrators 66, 67, 68, 69, respectively, and the gates $1^2$ and $2^2$ are controlled upon application of pulses from two of the multivibrators. Gate $1^2$ is controlled by multivibrators 66 and 68. Gate $2^2$ is controlled by multivibrators 67 and 69.

Figure 3:
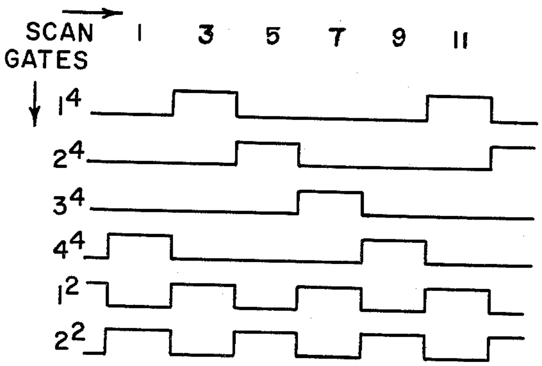
FIGURE 3 shows the timing waves for the gates of FIGURE 2.

Referring to FIGURE 3, the waveforms show when the gates are open for a particular cycle of events. Thus, the gate $1^4$ is open during the fifth scan, thirteenth, etc., the gate $2^4$ during the seventh, fifteenth, etc.; the gate $3^4$ during the ninth, seventeenth, etc.; and the gate $4^4$ during the eleventh, nineteenth, etc.; the gate $1^2$ during the fifth, ninth, thirteenth, etc.; and the gate $2^2$ during the first, fifth and ninth, etc. When the gates are open, they serve to pass the signal applied thereto.

Figure 11:
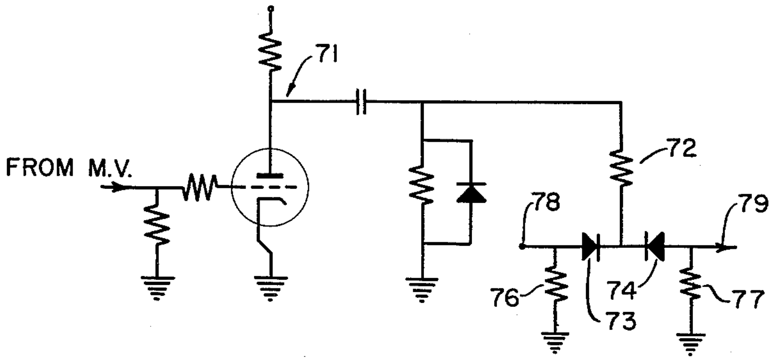
FIGURE 11 is a circuit diagram of a suitable gating circuit.

Referring particularly to FIGURE 11, a suitable gating circuit for the four gates $1^4$, $2^4$, $3^4$, $4^4$ is shown. The output from the multivibrators is applied to the amplifier 71 and the output of the amplifier is coupled through a resistor 72 to the oppositely poled diodes 73 and 74 which have their opposite ends connected to ground through the resistors 76 and 77. The diodes conduct upon application of an amplified gating pulse from the amplifier 71. When the diodes are conducting there is a signal path between the terminals 78 and 79. The gating circuits for gates $1^2$ and $2^2$ are similar with the exception that a dual tube is used in the amplifier circuit. The pulses from the multivibrators are connected to the grids. The gate itself is identical. The gate illustrated is a balanced arrangement whereby it does not introduce spurious signals into the signals which are passed.

Referring to FIGURE 4, the connection of the various gates to the filters 21–24 and to the Q line are shown, for the example previously described, to sample and obtain the signal shown in FIGURE 5. The $Y_L$ filter is connected to the gate $2^2$, the $I_H$ filter and Q line are connected to the gate $1^4$, and $I_L$ and $I_H$ filters are connected to the gate $3^4$, and the $Y_H$ filter is directly connected to a mixer which serves to mix the signal output of the gates.

As previously described, the switcher 26 may also include means for processing the sync pulses whereby the same have a standard width and include all of the information necessary for timing a television receiver. Referring particularly to FIGURE 2, such a means may include a blanking generator and sync adder 81 which is controlled by the multivibrators. The blanking generator forms the blanking pulse and the sync adder adds the sync pulses to the same. The output of the blanking generator and sync adder 81 is applied to an amplifier and sync clipper 82 which serves to amplify and limit the amplitude of the sync pulses. The output signal is applied to the mixer forming part of the switcher 26.

Referring to the gating waveforms (FIGURE 3) and the connection of the gates (FIGURE 4), the derivation of the signals shown in FIGURE 5 may be easily understood. On scan 3 multivibrators have biased the gates $4^4$ and $2^2$ open. With reference to FIGURE 4, the gate $2^2$ passes the $Y_L$ signal and the gate $4^4$ is not connected. Thus, the output on scan 3 is the $Y_L$ signal and the $Y_H$, which is not gated. These two signals are applied to the mixer 83 which serves to form the signal shown in FIGURE 5, scan 3. During scan 5 the gates $1^4$ and $1^2$ are open. Gate $1^4$ is connected to the Q line and the $I_H$ filter and the gate $1^2$ is not connected to any of the lines. The input to the mixer will include the Q signal, the $I_H$ signal and the $Y_H$ signal. During the seventh scan the gates $2^4$ and $2^2$ are open. Only $2^2$ is connected and passes $Y_L$ as indicated to give the composite signal including $Y_{L7}$ and $Y_{H7}$. During the ninth scan the gates $3^4$ and $1^2$ are open. The gate $3^4$ passes $I_L$ and $I_H$, and the gate $1^2$ is not connected. Thus, the output will include $Y_H$, $I_L$, and $I_H$ as indicated by scan 9, FIGURE 5. During the eleventh scan gates $4^4$ and $2^2$ are open thereby passing $Y_{L11}$ and $Y_{H11}$ to form the signal shown at scan 11 in FIGURE 5. The operation for scanning line 13 is similar to that for 5 and the process is repeated to form the composite simplex signal illustrated in FIGURE 5.

Figure 8:
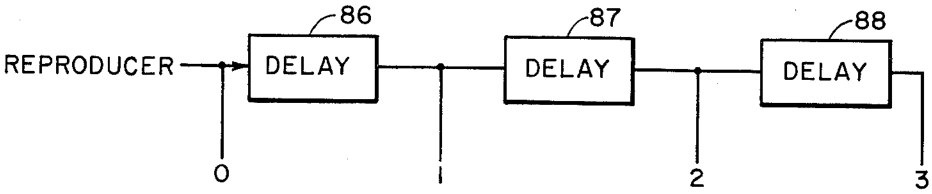
FIGURE 8 is a block diagram of the delay line repeater of FIGURE 1.
Figure 12:
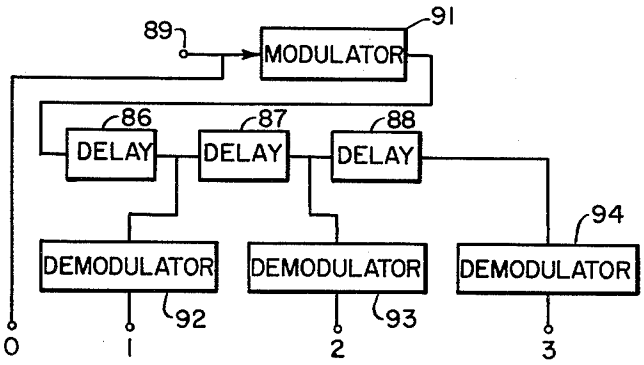
FIGURE 12 shows another embodiment of the delay line repeater of FIGURE 1.

Delay line repeaters 28 suitable for introducing the 63.5, 127, and 190.5 microseconds' delay in the reconstruction portion of the system are illustrated in FIGURES 8 and 12. The delay line repeater shown in FIGURE 8 includes three delay means 86, 87 and 88 which are serially connected to receive the reproduced or received signal. The total signal is passed through each delay line and the signal is available with predetermined delays at the lines 0, 1, 2 and 3, as previously described. The delay means 86, 87 and 88, for example, may comprise quartz delay lines. When broad band information is delayed by the delay lines, it is preferable to modulate the signal input to the lines upon RF carrier and to demodulate the signal after the delays. The modulation process serves to increase the bandwidth capabilities of the delay lines. The reproduced or received signal input is applied to the terminal 89 which is directly connected to the line 0 and to the modulator 91. The signal serves to modulate a carrier and the modulated carrier is applied to the delay lines 86, 87 and 88. A demodulator 92 is included in the output lines connected to each of the delay lines. The output of the demodulators is the original signal appropriately delayed.

Figure 9:
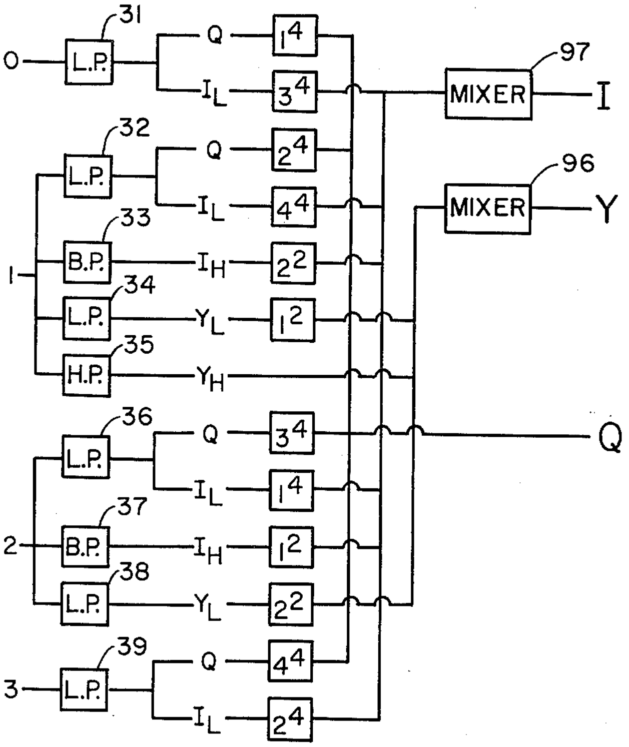
FIGURE 9 shows the connection of the gates in the reproducing or receiving switcher of FIGURE 1.

The connection of the switcher previously described for reconstructing the signal is illustrated in FIGURE 9. The lines 0–3 are shown connected to the appropriate filters 31–39. The outputs of the filters are applied to the gates $1^4$, $2^4$, $3^4$, $4^4$, $1^2$ and $2^2$ as shown. The signals appearing at the output of the various filters 31–39 are identified by the letters Q, $I_L$, $I_H$, $Y_L$, and $Y_H$. The output signal from the gates is applied to mixers 96 and 97 which are connected to the Y and I output terminals respectively, and to the Q output terminal.

Gate $1^4$ is connected to the low pass filters 31 and 36. The gate $2^4$ is connected to the low pass filters 32 and 39. The gate $3^4$ is connected to the low pass filters 31 and 36. The gate $4^4$ is connected to the low pass filters 32 and 39. The gate $1^2$ is connected to the low pass filter 34 and to band pass filter 37. The gate $2^2$ is connected to low pass filter 38 and to band pass filter 33.

Referring to FIGURES 3, 5, 9 and 10, the action of the switcher to reconstruct the signal is clearly illustrated. It is noted that during scan 3 gates $1^4$ and $1^2$ are open. Gate $1^4$ passes $Q_5$ and $I_{L1}$; gate $1^2$ passes $Y_{L3}$ and $I_{H1}$; and $Y_H$ is not gated. The signal shown for scan 3 (FIGURE 10) appears at the output terminals Y, I and Q. Similarly, the various other signals are obtained by the opening of selected ones of the gates $1^4$, $2^4$, $3^4$, $4^4$, $1^2$, and $2^2$, as previously described and shown in the waveforms of FIGURE 3.

Thus, it is seen that there is provided a signal processing and recording system and method in which a plurality of signals each occupying a relatively broad bandwidth are sampled and mixed to form a composite signal occupying a bandwidth corresponding generally to that of the signal having the broadest frequency band and containing only simple signals. The resultant composite signal is suitable for recordation and/or reproduction. The signal is also suitable for application to the modulator of a transmitter for transmission.

The signal is such that upon reproduction it may be processed to reconstruct a signal containing signal intelligence corresponding to the original signal intelligence.

The processing system described is particularly suitable for the processing of color video signal intelligence so that it may be recorded and reproduced or transmitted and received by the same type of apparatus as is presently employed in connection with monochrome video signal intelligence.

It is understood that although specific reference is made to the U.S. NTSC color video signals, that the processing and recording system and method may be used to process and record color signals employed in other types of television systems. The processing system and method may also be employed for processing other signal intelligence having similar characteristics.

I claim:

1. In a method for recording a color video signal of the type which includes a luminance signal and first and second chrominance signals, each of said signals occupying a predetermined bandwidth, separating said luminance signal into third and fourth frequency bands, said third frequency band occupying a bandwidth corresponding to the first chrominance signal, separating said first chrominance signal into fifth and sixth frequency bands, said fifth frequency band having a bandwidth corresponding to the second chrominance signal, periodically sampling said third, fourth, fifth, sixth frequency bands and said second chrominance signal in a predetermined sequence, mixing said signal samples to form a composite signal having a bandwidth corresponding to the luminance signal and containing a simple frequency spectrum, and recording said composite signal.

2. In a method for recording a color video signal of the type which includes a luminance signal and first and second chrominance signals, each of said signals occupying a predetermined bandwidth and containing redundant information, separating said luminance signal into third and fourth signals each occupying a predetermined bandwidth, said third luminance signal occupying a bandwidth corresponding to the bandwidth of said first chrominance signal, separating said first chrominance signal into fifth and sixth frequency bands having predetermined bandwidths, said fifth signal occupying a bandwidth corresponding to the second chrominance signal, continuously sampling the said fourth luminance signal bandwidth, and periodically sampling the third luminance signal, the fifth and sixth chrominance signals, and the second chrominance signal, combining said signal samples to form a composite bandwidth which includes a simple signal and contains preselected portions of the signal intelligence.

3. The method as in claim 2 together with the additional step of recording the composite signal.

4. In a method for processing a color video signal of the type which is derived by scanning a scene in a predetermined manner and which includes a luminance signal and first and second chrominance signals each of said signals occupying a predetermined bandwith and containing redundant information, separating said luminance signal into third and fourth signals each occupying predetermined bandwidths, said third luminance signal occupying a bandwidth corresponding to the bandwidth of the first chrominance signal, separating said first chrominance signal into fifth and sixth frequency bands having predetermined bandwidths, said fifth signal occupying a bandwidth corresponding to the second chrominance signal, continuously sampling the fourth luminance signal bandwidth, sampling the third luminance signal bandwidth every other scanning line, sampling the fourth luminance and sixth chrominance signals every other scanning line, sampling the fifth and second chrominance signals every fourth line, and combining said signals to form a composite signal which includes a simple signal occupying a bandwidth substantially equal to the luminance signal and contains preselected portions of the redundant signal intelligence.

5. The method as in claim 4 together with the additional step of recording the composite signal.

6. In a method for recording a color video signal of the type which includes a luminance signal and first and second chrominance signals each of said signals occupying a predetermined bandwidth, separating said luminance signal into third and fourth frequency bands, said third luminance signal occupying a bandwidth corresponding generally to the first chrominance signal, separating said first chrominance signal into fifth and sixth frequency bands, said fifth band having a bandwidth corresponding to the second chrominance signal, periodically sampling said first and second luminance signal, third and fourth chrominance signal and said second chrominance signal in a predetermined sequence, mixing said signal samples to form a composite signal having a bandwidth corresponding to the luminance signal and containing a simple frequency spectrum, processing said signal to reform the vertical and horiontal sync pulses, and recording said composite processed signal.

7. In a method for recording a color video signal of the type which includes a luminance signal and first and second chrominance signals each of said signals occupying a predetermined bandwidth, separating said luminance signal into third and fourth frequency bands, said third frequency band occupying a bandwidth corresponding to the first chrominance signal, separating said first chrominance signal into fifth and sixth frequency bands, said fifth frequency band having a bandwidth corresponding to the second chrominance signal, periodically sampling said third, fourth, fifth, sixth frequency bands and said second chrominance signal in a predetermined sequence, and mixing said signal samples to form a composite signal having a bandwidth corresponding to the luminance signal and containing a simple frequency spectrum.

8. In a method for reproducing and reconstructing a recorded signal which was formed from a plurality of signals each occupying a relatively wide frequency band and containing redundant signal intelligence formed by the steps of separating and passing selected ones of said signals into upper and lower frequency bands and passing others of said signals to form a new set of frequency bands, and periodically sampling said new frequency band in a predetermined sequence, combining said signal samples to form a composite signal having a simple bandwidth and containing only portions of the redundant signal intelligence and recording said composite signal, the step of reproducing said recorded signal, delaying said signal predetermined fixed amounts, separating the signal having various delays into a plurality of frequency bands, periodically sampling said new frequency bands in a predetermined sequence, combining said signal samples to form a plurality of signals each occupying a relatively broad frequency band and containing substantially the same signal intelligence as that which was originally processed for recordation.

9. In a method for reproducing and reconstructing a color video signal of the type which includes a luminance signal and first and second chrominance signals, each of said signals occupying a predetermined bandwidth, and which was recorded by separating said luminance signal into third and fourth frequency bands, said third frequency band occupying a bandwidth corresponding to the first chrominance signal, separating said first chrominance signal into fifth and sixth frequency bands, said fifth frequency band having a bandwidth corresponding to the second chrominance signal, periodically sampling said third, fourth, fifth, sixth frequency bands and said second chrominance signal in a predetermined sequence, mixing said signal samples to form a composite signal having a bandwidth corresponding to the luminance signal and containing a simple frequency spectrum, and recording said composite signal, the steps of reproducing said recorded composite signal, applying said reproduced composite signal to a delay line which serves to delay the signal predetermined fixed amounts, separating the signal having said predetermined delays into predetermined frequency bands corresponding to the first chrominance signal, the second chrominance signal, the fourth luminance signal, and the sixth chrominance signal, selectively sampling from said frequency bands, combining said selected signal samples to form signals corresponding to the color video signals.

10. In a method for reproducing and processing a recorded color video signal of the type which is derived by scanning a scene in a predetermined manner and which includes a luminance signal and first and second chrominance signals each of said signals occupying a predetermined bandwidth and containing redundant information, and which was recorded by separating said luminance signal into third and fourth signals each occupying predetermined bandwidths, said third luminance signal occupying a bandwidth corresponding to the bandwidth of the first chrominance signal, separating said first chrominance signal into fifth and sixth frequency bands having predetermined bandwidths, said fifth signal occupying a bandwidth corresponding to the second chrominance signal, continuously sampling the fourth luminance signal bandwidth, sampling the third luminance signal bandwidth every other scanning line, sampling the fourth luminance and sixth chrominance signals every other scanning line, sampling the fifth and second chrominance signals every fourth line, combining said signals to form a composite signal which includes a simple signal occupying a bandwidth substantially equal to the luminance signal and containing preselected portions of the redundant signal intelligence, the steps of reproducing said recorded signal to form a composite signal, applying said composite signal to a delay line, separating the signal having predetermined delays into predetermined bands, low frequency bands corresponding to the second chrominance signal band, mid-frequency bands corresponding to the sixth chrominance signal, high frequency bands corresponding to the fourth luminance signal and second low frequency bands corresponding to the first chrominance signal, sampling the low frequency bands sequentially at each of the delays, sampling the mid-frequency bands at two of the sequential delay lines and sampling the high frequency information at one of the delay lines and sampling the second low frequency information at two of the delay lines, mixing said signals and forming signals corresponding to the original recorded signals.

11. A signal processing and recording system comprising a plurality of filter means for receiving a plurality of signals having relatively wide bandwidths and forming a plurality of signals occupying narrower bandwidths, means for selectively sampling the signals at each of said filter means to provide signal samples having separate and distinct bandwidths, means for combining the signal samples to form a composite signal, means for recording said signal samples, means for reproducing the composite signal, serial delay means serving to receive said reproduced composite signal and delay the same predetermined fixed amounts to provide recurrence of the composite signal at various points in the delay means, filter means connected to receive the signal at the various points in the delay means and serving to form a new set of frequency bands each containing original information, means for sampling from each of said filters to form a plurality of signal samples, means for combining said signal samples to form a plurality of signals corresponding to the original signal intelligence.

12. A signal processing system comprising a plurality of parallel filter means for separating incoming signals having relatively wide bandwidths into a plurality of signals occupying narrower bandwidths, at least two of said filter means having overlapping bandpasses switching means comprising a plurality of gates and binaries serving to control said gates, said separated signals being applied individually to the gates, said binaries serving to control the opening and closing of the gates whereby the signals are selectively passed, combining means serving to receive said selectively passed signals and combine same to form a composite signal, and means for recording said composite signal.

13. A color video signal processing system comprising a plurality of filter means for separating incoming video signals which contain a luminance and first and second chrominance signals into a plurality of signals, a pair of said filters serving to pass the low and high frequency components of the luminance signal, and another pair of said filters serving to pass the low and high frequency components of a first chrominance signal, switching means for selectively sampling signals from the filters and the second chrominance signal to provide signal samples, means for combining said signal samples to form a composite signal, and means for recording said composite signal.

14. A signal processing and recording system comprising a plurality of filter means for receiving a plurality of signals each having a relatively wide bandwidth and forming a plurality of bandwidths occupying narrower bandwidths, switching means, said switching means comprising gate means and binaries serving to selectively operate said gate means, said gates being connected to receive said plurality of bandwidths and to pass preselected ones of the same, means for combining the signal samples to form a composite signal, means for recording said signal samples, means for reproducing a composite signal, serial delay means serving to receive said reproduced composite signal and delay the same a predetermined fixed amount to provide recurrence of the composite signal at various points in delay means, filter means connected to receive the signal at the various points in the delay means and serving to form a new set of frequency bands each containing signal information, switching means, said switching means including gate means connecting to said filters and binaries serving to control said gates, means for combining the signal samples passed by said gates to form a plurality of signals corresponding to the original signal intelligence.

References Cited in the file of this patent

UNITED STATES PATENTS

| | | |
|---|---|---|
| 1,769,918 | Gray et al. | July 8, 1930 |
| 2,272,638 | Hardy | Feb. 10, 1942 |
| 2,681,385 | Oliver | June 15, 1954 |
| 2,686,831 | Dome | Aug. 17, 1954 |
| 2,732,424 | Oliver | Jan. 24, 1956 |
| 2,811,578 | Rieke | Oct. 29, 1957 |
| 2,850,574 | Kretzmer | Sept. 2, 1958 |
| 2,892,017 | Houghton | June 23, 1959 |
| 2,960,563 | Anderson | Nov. 15, 1960 |
| 2,972,013 | Altes | Feb. 14, 1961 |

OTHER REFERENCES

RCA, A Magnetic Tape System for Recording and Reproducing Standard FCC Color Television Signals, reprinted from RCA Review for September 1956, vol. VXII, No. 3, pages 333, 334, 341, 343.